United States Patent
Chu et al.

(10) Patent No.: US 11,240,178 B2
(45) Date of Patent: Feb. 1, 2022

(54) DATA TRANSMISSION METHOD AND DATA TRANSMISSION SYSTEM

(71) Applicant: Realtek Semiconductor Corporation, Hsinchu (TW)

(72) Inventors: Shih-Chiang Chu, Hsinchu (TW); Chia-Hung Lin, Hsinchu (TW); Zhen-Ting Huang, Hsinchu (TW); Er-Zih Wong, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 16 days.

(21) Appl. No.: 16/838,202

(22) Filed: Apr. 2, 2020

(65) Prior Publication Data
US 2020/0336440 A1    Oct. 22, 2020

(30) Foreign Application Priority Data
Apr. 16, 2019 (TW) .................. 108113259

(51) Int. Cl.
*H04L 12/861* (2013.01)
*H04L 29/06* (2006.01)
*H04L 12/863* (2013.01)
*H04L 12/801* (2013.01)

(52) U.S. Cl.
CPC .............. *H04L 49/90* (2013.01); *H04L 47/29* (2013.01); *H04L 47/50* (2013.01); *H04L 69/12* (2013.01); *H04L 69/16* (2013.01)

(58) Field of Classification Search
CPC ......... H04L 49/90; H04L 69/12; H04L 47/50; H04L 47/29; H04L 69/16; H04L 49/107; H04L 49/9063
See application file for complete search history.

(56) References Cited

U.S. PATENT DOCUMENTS

| | | | | |
|---|---|---|---|---|
| 2017/0353403 | A1* | 12/2017 | Zemach | H04L 49/9042 |
| 2018/0095996 | A1* | 4/2018 | Kondiles | G06F 16/2365 |
| 2019/0068507 | A1* | 2/2019 | Livne | H04L 45/74 |
| 2019/0229999 | A1* | 7/2019 | Sarfaty | H04L 41/14 |
| 2020/0186807 | A1* | 6/2020 | Seregin | H04N 19/14 |

FOREIGN PATENT DOCUMENTS

| | | |
|---|---|---|
| CN | 101540727 B | 5/2012 |
| TW | 200947210 A | 11/2009 |
| WO | 2009100391 A2 | 8/2009 |

* cited by examiner

*Primary Examiner* — Walli Z Butt
*Assistant Examiner* — Shawn D Miller
(74) *Attorney, Agent, or Firm* — Locke Lord LLP; Tim Tingkang Xia, Esq.

(57) ABSTRACT

A data transmission method for a data transmission system including a host and a peripheral device is disclosed, including: setting at least one identification number to at least one packet stored in the host; transmitting the at least one packet from the host to the peripheral device; allocating the at least one packet to plural temporary blocks of a memory of the peripheral device corresponding to the at least one identification number according to the at least one identification number of the at least one packet. Each of the temporary blocks includes a threshold value, and the threshold value of each of at least two of the temporary blocks are different; and transmitting part of the at least one packet stored in one of the temporary blocks when the one of the temporary blocks reaches the threshold value of the one of the temporary blocks.

18 Claims, 3 Drawing Sheets

DATA TRANSMISSION METHOD AND DATA TRANSMISSION SYSTEM

CROSS-REFERENCE TO RELATED APPLICATION

This application claims the priority benefit of TAIWAN Application serial no. 108113259, filed Apr. 16, 2019, the full disclosure of which is incorporated herein by reference.

FIELD OF INVENTION

The invention relates to a data transmission method and a data transmission system. More particularly, the invention relates to a data transmission method and a data transmission system for universal serial bus (USB).

BACKGROUND

In the data transmission system, if the data in the memory of the main system is moved to the memory of the peripheral element through the universal serial bus (USB), aggregation technology is adopted to reduce the number of times of transfers. However, for high-priority data, if data must be processed in the order in which they are arranged, the delay time will be greatly increased. However, if aggregation technology is not adopted, the utilization of the central processor will increase.

Therefore, how to prioritize high-priority data through the streaming mode without increasing the utilization of central processor, thereby improving the data delay time, is one of the problems need to be improved in the field.

SUMMARY

An aspect of this disclosure is to provide a data transmission method, applicable for a data transmission system. The data transmission system includes a host and a peripheral device, in which the data transmission method includes the following operations: setting at least one identification number to at least one packet stored in the host by a processor of the host; transmitting the at least one packet from the host to the peripheral device through a transmission medium; allocating the at least one packet to a plurality of temporary blocks of a memory of the peripheral device corresponding to the at least one identification number according to the at least one identification number of the at least one packet by a processor of the peripheral device, wherein each of the temporary blocks includes a threshold value, and the threshold value of each of at least two of the temporary blocks are different; and transmitting part of the at least one packet stored in one of the temporary blocks through an output input interface when the one of the temporary blocks reaches the threshold value of the one of the temporary b locks.

Another aspect of this disclosure is to provide a data transmission system including a host and a peripheral device. The host includes a memory and a processor. The memory is configured to store at least one packet. The processor is configured to set at least one identification number to the at least one packet, and to transmit the at least one packet through a transmission medium. The peripheral device is connected to the host through the transmission medium, the peripheral device is configured to receive the at least one packet. The peripheral device includes a memory and a processor. The memory includes plural temporary blocks, in which each of the temporary blocks includes a threshold value, the threshold value of each of at least two of the temporary blocks are different. The processor is configured to allocate the at least one packet to the temporary blocks corresponding to the at least one identification number according to the at least one identification number of the at least one packet, when one of the temporary blocks reaches the threshold value of the one of the temporary blocks, part of the at least one packet stored in the one of the temporary blocks is transmitted through an output input interface.

Embodiments of the present disclosure provide a data transmission method and a data transmission system, and in particular, a data transmission method and a data transmission system for universal serial bus (USB), in order to improve the data delay time by prioritizing the high-priority data through the streaming mode without increasing the utilization of central processor.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
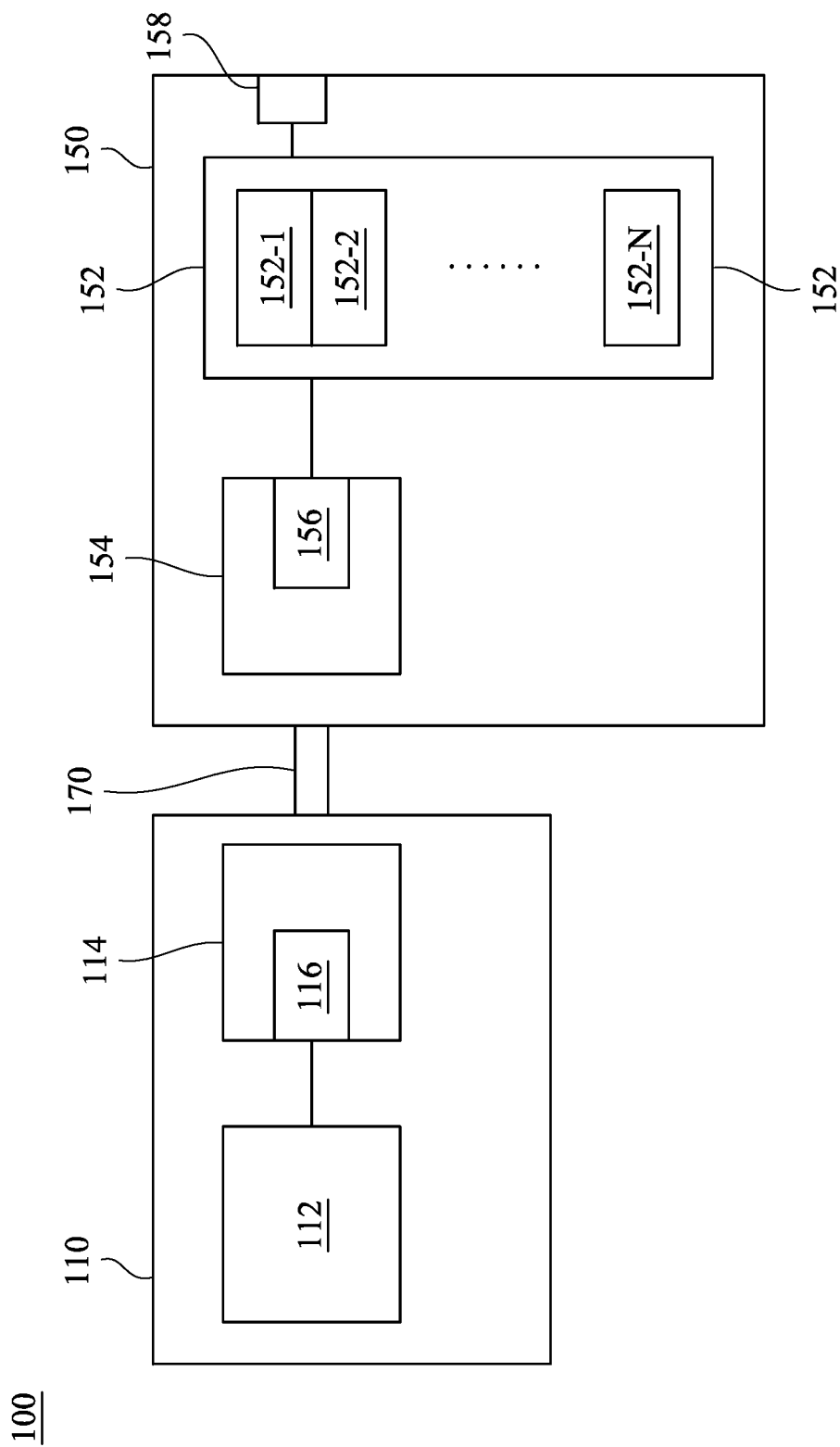
FIG. 1 is a schematic diagram illustrating a data transmission system according to some embodiments of the present disclosure.

The following disclosure provides many different embodiments, or examples, for implementing different features of the invention. Specific examples of elements and arrangements are described lower than to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed lower than, or elsewhere in the specification, to provide additional guidance to the practitioner regarding the description of the invention.

FIG. 1 is a schematic diagram illustrating a data transmission system 100 according to some embodiments of the present disclosure. The data transmission system 100 includes the host 110 and the peripheral device 150. The host 110 and the peripheral device 150 are connected through the transmission medium 170. The host 110 includes the memory 112 and the processor 114. The peripheral device 150 includes the memory 152, the processor 154, and the output input interface 158. The memory 152 includes plural temporary blocks 152-1 to 152-N. Plural temporary blocks 152-1 to 152-N respectively include a threshold value. The data transmission system 100 illustrated in FIG. 1 is for illustrative purposes only, but the present disclosure is not limited thereto.

In the embodiments of the present disclosure, the memories 112 and 152 are FIFO (First In First Out, FIFO) memories. However, the embodiments of the present disclosure are not limited thereto. In some embodiments, the transmission medium 170 may be universal sequence bus (USB) transmission line or USB interface transmission circuit. In some embodiments, the peripheral device 150 may be a wired network card or a wireless network card, but the embodiments of the present disclosure are not limited thereto. In some embodiments, the transmission medium 170 is the USB 3.0 specification.

In the connection relationship, the host 110 and the peripheral device 150 are connected through the transmission medium 170. The memory 112 is coupled to the processor 114. The memory 152 is coupled to the processor 154, and the processor 154 is coupled to the output input interface 158.

In the operational relationship, the memory 112 of the host 110 is configured to store at least one packet. When the host 110 transmits the at least one packet to the peripheral device 150, the processor 114 of the host 110 sets an identification number (Stream ID) to each packet. In detail, the processor 114 determines a priority of each of the at least one packet, and, the processor 114 sets at least one identification number (Stream ID) to each packet according to the priority of each of the at least one packet. Then, the processor 114 of the host 110 transmits at least one packet to the peripheral device 150 through the transmission medium 170.

After the peripheral device 150 receives the at least one packet transmitted from the host 110, the processor 154 of the peripheral device 150 allocates at least one packet to the temporary blocks 152-1 to 152-N corresponding to the identification number according to each identification number of the at least one packet. When one of the temporary blocks 152-1 to 152-N reaches the threshold value, the processor 154 performs packet transmission operation through the output input interface 158 so that the packet temporarily stored in one of the temporary blocks 152-1 to 152-N is transmitted to other devices via Ethernet or other wired/wireless transmission. In another embodiment, the above packet transfer operation is performed by the processor 114 on the host side.

In some embodiments, the threshold value of each of the temporary blocks 152-1 to 152-N as described above are set by the processor 114. The threshold value may be a packet amount or a storage capacity, but the embodiments of the present disclosure are not limited to this. In another embodiment, the threshold value of each of the temporary blocks 152-1 to 152-N are set by the processor 154 of the peripheral device 150.

Figure 2:
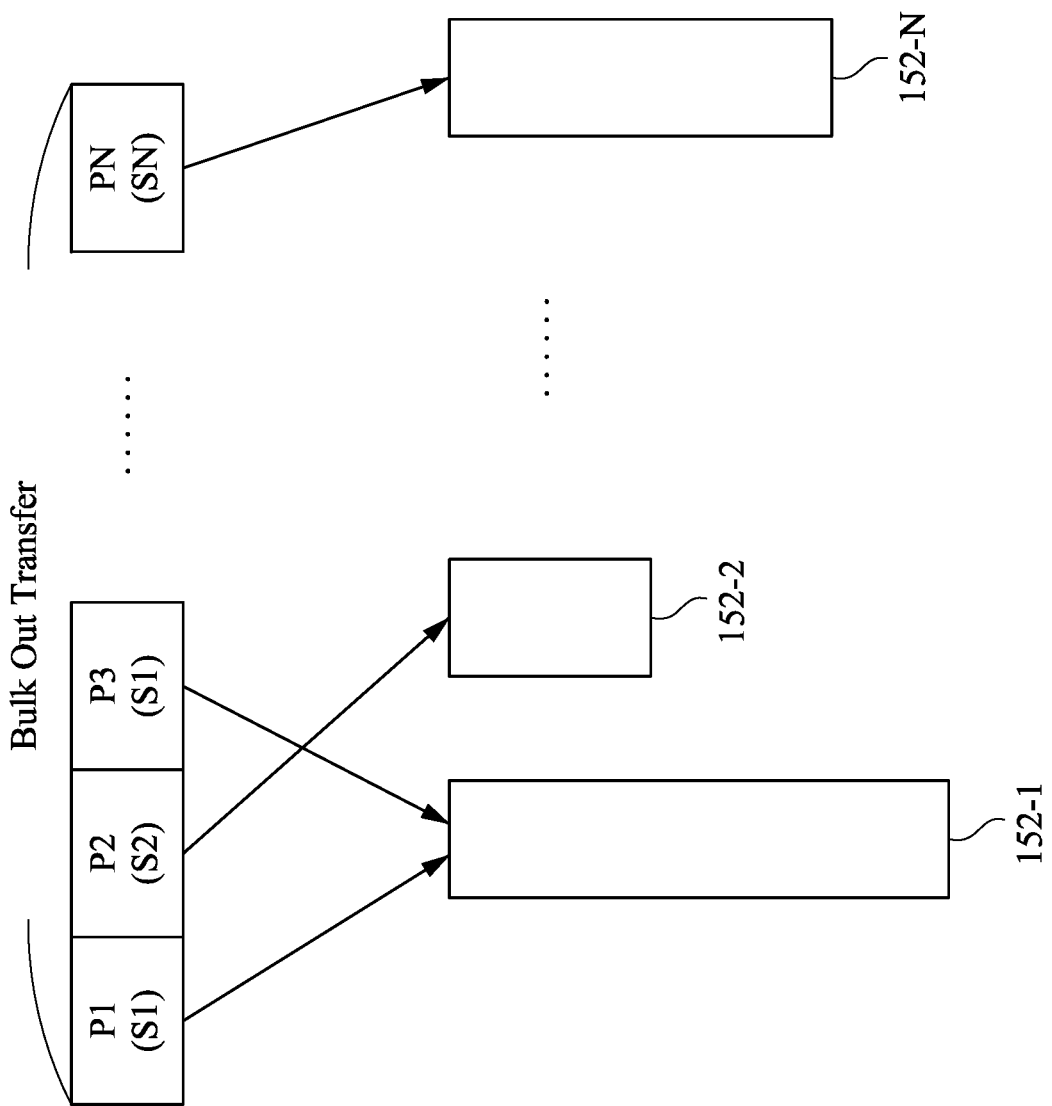
FIG. 2 is a schematic diagram illustrating a data transmission system according to some embodiments of the present disclosure.

In detail, reference is made to FIG. 1 and FIG. 2 at the same time. FIG. 2 is a schematic diagram illustrating a data transmission system 100 according to some embodiments of the present disclosure. The packets P1 to PN are packets transmitted from the host 110 in FIG. 1 to the peripheral device 150 in FIG. 1. The temporary blocks 152-1 to 152-N illustrated in FIG. 2 include different lengths to represent different threshold value sizes.

As illustrated in FIG. 2, each of packets P1 to PN includes one of the identification numbers S1 to SN set by the host 110. For example, the processor 114 of the host 110 sets the identification number of the packet P1 to be S1, the identification number of the packet P2 to be S2, the identification number of the packet P3 to be S1, and the identification number of the packet PN to be SN. Subsequently, the host 110 transmits the packets P1 to PN to the peripheral device 150 with a Bulk Out Transfer method.

After receiving the packets P1 to PN from the peripheral device 150, the processor 154 stores the packets P1 to PN according to the respective identification numbers of the packets P1 to PN to the temporary blocks 152-1 to 152-N corresponding to the identification number. For example, since the identification number of the packet P1 is S1, the processor 154 allocates and stores the packet P1 to the temporary block 152-1 corresponding to the identification number S1; since the identification number of the packet P2 is S2, the processor 154 allocates and stores the packet P2 to the temporary block 152-2 corresponding to the identification number S2; since the identification number of the packet P3 is S1, the processor 154 allocates and stores the packet P3 to the temporary block 152-1 corresponding to the identification number S1; since the identification number of the packet PN is SN, the processor 154 allocates and stores the packet PN to the temporary block 152-N corresponding to the identification number SN, and so on.

Subsequently, when one of the temporary blocks 152-1 to 152-N reaches the threshold value, the processor 154 transmits out the packet stored by one of the temporary blocks 152-1 to 152-N.

In some embodiments, the temporary block configured to process high priority packets contains a smaller threshold value to store packets of high priority.

As illustrated in FIG. 2, the threshold value of the temporary block 152-2 is smaller than the threshold values of the rest of the temporary blocks, that is, the temporary block 152-2 is configured to store packets with high priority. When the Processor 114 in FIG. 1 determines that the packet P2 is a packet with high priority, the processor 114 sets the identification number of the packet P2 to be S2. In this way, when the packet P2 is transmitted to the peripheral device 150, the processor 152 stores the packet P2 with high priority to the temporary block 152-2.

Since the temporary block 152-2 includes a smaller threshold value, the packet stored in the temporary block 152-2 may be sent out sooner. For example, assume that the threshold value of the temporary block 152-2 is 1 packet. When packet P2 is stored in the temporary block 152-2, the temporary block 152-2 reaches the threshold value, so the packet P2 may be sent soon. Compared with the temporary block 152-2, the remaining temporary blocks 152-1, 152-3 to 152-N, etc., include a larger threshold value and the packets stored in the remaining temporary blocks 152-1, 152-3 to 152-N will not be sent until the respective temporary blocks 152-1, 152-3, and 152-N reach their respective threshold values.

In some embodiments, if the transmission of the packets stored in one of the temporary blocks 152-1 to 152-N is finished, the processor 154 of the peripheral device 150 releases the space of one of the temporary blocks 152-1 to 152-N. For example, when the processor 154 transmits the packets stored in the temporary block 152-2 through the output input interface 158, the processor 154 releases the space of the temporary block 152-2. In this way, the remaining packets containing the identification number S2 can be stored in the temporary block 152-2.

Reference is made to FIG. 1 again. In some embodiments, the processor 114 further includes a multiplex circuit 116 for obtaining at least one packet from the memory 112, and setting an identification number to each packet according to the priority of each packet. In some embodiments, the processor 154 further includes a multiplex circuit 156 for obtaining the identification number of each packet from each packet, and assigning at least one packet to the corresponding temporary block according to the identification number.

As mentioning above, in the embodiments of the present disclosure, by setting different threshold values to the respective temporary blocks of the peripheral device, and setting the identification number to each packet. In this way, high-priority data can be stored in the temporary block with a lower threshold value without increasing the central processor utilization, so that the data processing can be prioritized in the streaming mode, thereby improving the data delay time.

Figure 3:
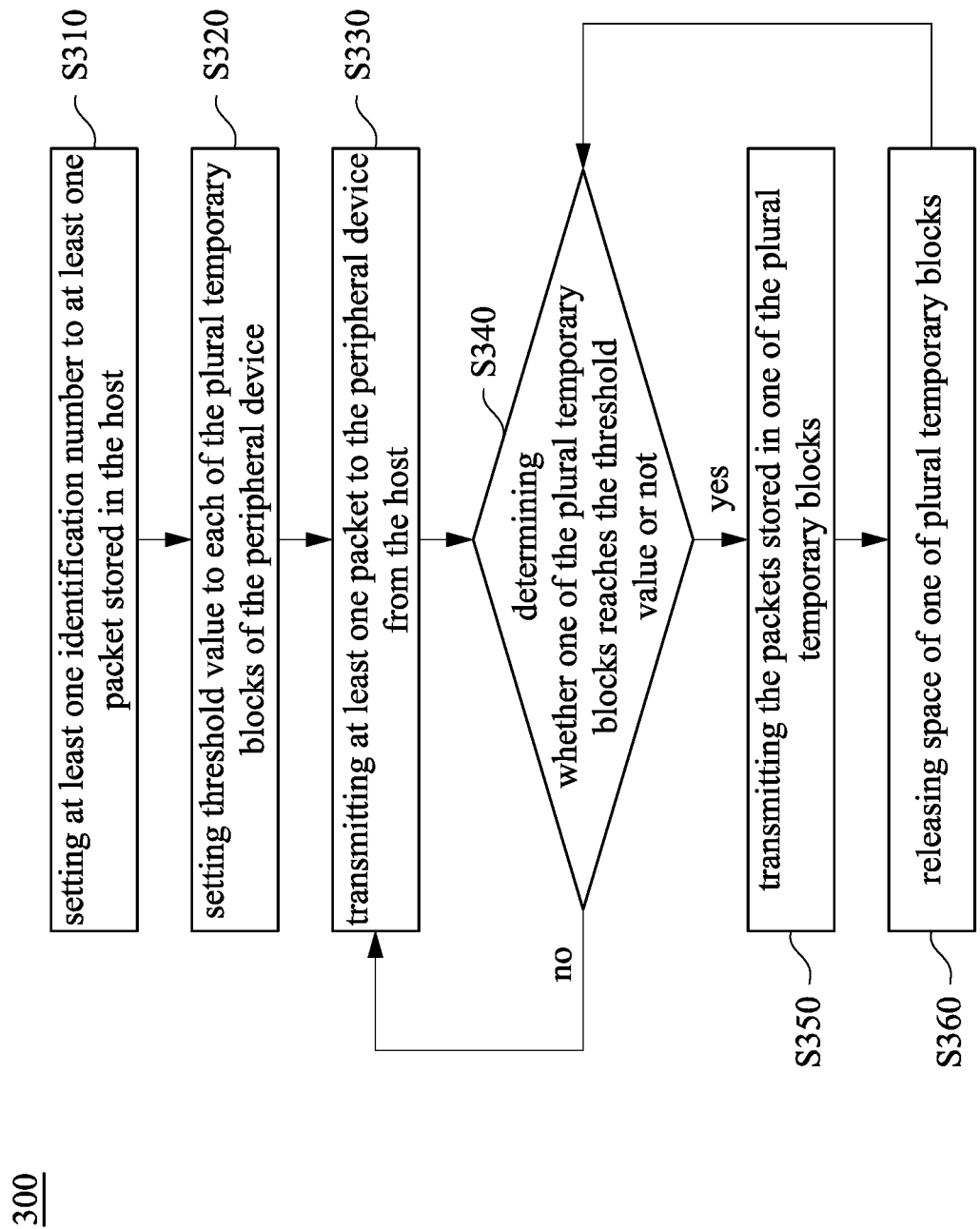
FIG. 3 is a flow chart illustrating a data transmission method according to some embodiments of the present disclosure.

Reference is made to FIG. 3. FIG. 3 is a flow chart illustrating a data transmission method 300 according to some embodiments of the present disclosure. As illustrated in FIG. 3, the data transmission method 300 includes operations S310 to S360. In order to make the data transmission method 300 of the present embodiment easy to understand, reference is made to FIG. 1 to FIG. 3.

In operation S310, setting at least one identification number to at least one packet stored in the host. In some embodiments, operation S310 may be operated by the processor 114 as illustrated in FIG. 1. For example, the multiplex circuit 116 of the processor 114 obtains at least one packet from the memory 112 and sets an identification number to each packet according to the priority of each packet. Each identification number corresponds to one of the temporary blocks 152-1 to 152-N as shown in FIG. 1.

In operation S320, setting threshold value to each of the plural temporary blocks of the peripheral device. In some embodiments, the operation S320 may be operated by the processor 114 as illustrated in FIG. 1 or the processor 154. For example, the processor 114 sets different threshold values to the temporary blocks 152-1 to 152-N. The threshold value may be a packet amount or a storage capacity. In some embodiments, the temporary block configured to store and process high priority packets include a smaller threshold value.

In operation S330, transmitting at least one packet to the peripheral device from the host. In some embodiments, operation S330 may be operated by the processor 114 as illustrated in FIG. 1. For example, the processor 114 transmits at least one packet to the peripheral device 150 through the transmission medium 170. In some embodiments, at least one packet is transmitted in a Bulk Out Transfer method.

In operation S340, determining whether one of the plural temporary blocks reaches the threshold value or not. If it is determined that one of the plural temporary blocks reaches the threshold value, operation S350 is executed. If it is determined that one of the plural temporary blocks has not reached the threshold value, operation S330 is executed to continue to transmit at least one packet to the peripheral device by the host.

In some embodiments, operation S340 may be performed by processor 154 as depicted in FIG. 1. For example, reference is made to FIG. 2. If the threshold value of the temporary block 152-2 is 1024 bytes (Byte). It is assumed that when packet P3 with a size of 1024 bytes is stored in the temporary block 152-2, it is determined that the temporary block 152-2 reaches the threshold value. On the other hand, if the threshold value of the temporary block 152-1 is 10240 bytes, when the temporary block 152-1 stores only packets P1 and P3 of a size of 1024 bytes, it is determined that the temporary block 152-1 has not reached the threshold value.

In operation S350, transmitting the packets stored in one of the plural temporary blocks. In some embodiments, operation S350 may be performed by the processor 154 as illustrated in FIG. 1 through the output input interface 158. For example, if the temporary block 152-2 reaches the threshold value, the processor 154 transmits the at least one packet stored in the temporary block 152-2 through the output input interface 158.

In operation S360, releasing space of one of several temporary blocks. In some embodiments, operation S360 may be operated by the processor 154 as illustrated in FIG. 1. For example, if the at least one packet stored by the temporary block 152-2 has been sent by the output input interface 158, the processor 154 releases the space of the temporary block 152-2 so that the remaining packets containing the identification number S2 can be stored. In the temporary block 152-2. In some embodiments, as shown in FIG. 3, after releasing the space of one of the temporary blocks, operation S340 is returned to continue to determine whether one of the plurality of temporary blocks reaches the threshold value or not.

In some embodiments, the processor 114 or 154 may be a server, a circuit, a central processing unit (CPU), or a microprocessor having functions of storing, computing, reading data, receiving signals or messages, transmitting signals or messages. MCU) or other equivalent device.

In some embodiments, memory 112 or 152 may be implemented as read-only memory, flash memory, floppy disk, hard drive, CD-ROM, flash drive, tape, network accessible database or familiar with the technology can easily think of the same function Storage device.

According to embodiments of the present disclosure, it is understood that the embodiments of the present disclosure provide a data transmission method and a data transmission system, and particularly a data transmission method and a data transmission system for a USB, so that high-priority data is preferentially processed through a streaming mode without increasing the central processor utilization. Thereby improving the data delay time.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A data transmission method, applicable for a data transmission system, wherein the data transmission system comprises a host and a peripheral device, wherein the data transmission method comprises:
   setting at least one identification number to at least one packet stored in the host by a processor of the host;

transmitting the at least one packet from the host to the peripheral device through a transmission medium;

allocating the at least one packet to a plurality of temporary blocks of a memory of the peripheral device corresponding to the at least one identification number according to the at least one identification number of the at least one packet by a processor of the peripheral device, wherein each of the plurality of temporary blocks comprises a threshold value, and the threshold value of each of at least two of the plurality of temporary blocks are different; and transmitting part of the at least one packet stored in one of the plurality of temporary blocks through an output input interface when the one of the plurality of temporary blocks reaches the threshold value of the one of the plurality of temporary blocks;

wherein the plurality of temporary blocks comprise a first temporary block configured to store a first packet of the at least one packet, wherein a priority of the first packet is high, and the data transmission method further comprises:

setting a smallest threshold value to the first temporary block.

2. The data transmission method of claim 1, comprising:
setting the threshold value of each of the temporary blocks of the peripheral device.

3. The data transmission method of claim 1, wherein the threshold value comprises a packet amount or a storage capacity.

4. The data transmission method of claim 1, further comprising:
setting the at least one identification number to the at least one packet according to a priority of each of the at least one packet.

5. The data transmission method of claim 1, wherein the plurality of temporary blocks comprise the first temporary block and a second temporary block, wherein the threshold value of the first temporary block is smaller than the threshold value of the second temporary block, and the first temporary block corresponds to a first identification number of the at least one identification number, wherein the data transmission method comprises:
setting the first identification number to the first packet when the priority of the first packet of the at least one packet is high.

6. The data transmission method of claim 1, further comprising:
releasing a space of the one of the plurality of temporary blocks when a transmission of a part of the at least one packet stored in the one of the plurality of temporary blocks is finished.

7. The data transmission method of claim 1, further comprising:
obtaining one of the at least one packet from a memory of the host, and setting one of the at least one identification number to the one of the at least one packet according to a priority of the one of the at least one packet by a multiplex circuit of the host.

8. The data transmission method of claim 1, further comprising:
determining a priority of each of the at least one packet by the processor of the host.

9. The data transmission method of claim 1, wherein the memory of the peripheral device comprises a first in first out (FIFO) circuit.

10. A data transmission system, comprising:
a host, comprising:
a memory, configured to store at least one packet; and
a processor, configured to set at least one identification number to the at least one packet, and to transmit the at least one packet through a transmission medium; and
a peripheral device, connected to the host through the transmission medium, wherein the peripheral device is configured to receive the at least one packet, wherein the peripheral device comprises:
a memory, comprising a plurality of temporary blocks, wherein each of the plurality of temporary blocks comprises a threshold value, the threshold value of each of at least two of the plurality of temporary blocks are different; and
a processor, configured to allocate the at least one packet to the plurality of temporary blocks corresponding to the at least one identification number according to the at least one identification number of the at least one packet, wherein when one of the temporary blocks reaches the threshold value of the one of the temporary blocks, part of the at least one packet stored in the one of the temporary blocks is transmitted through an output input interface;
wherein the temporary blocks comprises a first temporary block configured to store a first packet of the at least one packet, and when a priority of the first packet is high, the processor of the host is further configured to set a smallest threshold value to the first temporary block.

11. The data transmission system of claim 10, wherein the processor of the host is further configured to set the threshold value of each of the temporary blocks.

12. The data transmission system of claim 10, wherein the threshold value comprises a packet amount or a storage capacity.

13. The data transmission system of claim 10, wherein the processor of the host is further configured to set the at least one identification number to the at least one packet according to a priority of each of the at least one packet.

14. The data transmission system of claim 10, wherein the temporary blocks comprise the first temporary block and a second temporary block, the threshold value of the first temporary block is smaller than the threshold value of the second temporary block, the first temporary block corresponds to a first identification number of the at least one identification number, wherein when the priority of the first packet of the at least one packet is high, the processor of the host is further configured to set the first identification number to the first packet.

15. The data transmission system of claim 10, wherein when a transmission of the part of the at least one packet stored in the one of the temporary blocks is finished, a space of the one of the temporary blocks is released.

16. The data transmission system of claim 10, wherein the processor of the host comprises:
a multiplex circuit, configured to obtain one of the at least one packet from a memory of the host, and to set one of the at least one identification number to the one of the at least one packet according to a priority of the one of the at least one packet.

17. The data transmission system of claim 10, wherein the processor of the host is further configured to determine a priority of each of the at least one packet.

18. The data transmission system of claim 10, wherein the memory of the peripheral device comprises a first in first out (FIFO) circuit.

* * * * *